United States Patent [19]

Thompson-Rohrlich

[11] Patent Number: 5,504,852
[45] Date of Patent: Apr. 2, 1996

[54] METHOD FOR CREATING A COLLECTION OF ALIASES REPRESENTING COMPUTER SYSTEM FILES

[75] Inventor: John Thompson-Rohrlich, Palo Alto, Calif.

[73] Assignee: Apple Computer, Inc., Cupertino, Calif.

[21] Appl. No.: 400,430

[22] Filed: Mar. 2, 1995

Related U.S. Application Data

[63] Continuation of Ser. No. 150,743, Nov. 12, 1993, abandoned, which is a continuation of Ser. No. 756,934, Sep. 9, 1991, abandoned.

[51] Int. Cl.$^6$ .............................. G06F 3/14; G06F 17/30
[52] U.S. Cl. .................... 395/159; 395/157; 395/600; 364/DIG. 1; 364/237.2; 364/282.1; 364/286.3
[58] Field of Search ...................... 395/600, 159, 395/425, 157; 364/DIG. 1

[56] References Cited

U.S. PATENT DOCUMENTS

| 4,255,796 | 3/1981 | Gabbe | 395/600 |
|---|---|---|---|
| 4,813,013 | 3/1989 | Dunn | 364/900 |
| 5,047,918 | 9/1991 | Schwartz | 395/600 |
| 5,053,948 | 10/1991 | DeClute et al. | 395/600 |
| 5,058,162 | 10/1991 | Santon et al. | 395/600 |
| 5,206,949 | 4/1993 | Cochrene | 395/600 |
| 5,231,578 | 7/1993 | Levin et al. | 364/419 |
| 5,303,361 | 4/1994 | Colwell et al. | 395/425 |
| 5,305,435 | 4/1994 | Bronson | 395/159 |
| 5,367,626 | 11/1994 | Morioka et al. | 395/159 |

OTHER PUBLICATIONS

APS Text Search and Retrieval Classroom Manual Jun. 1989 pp. 3-3 to 3-10.
APS Text Search and Retrieval Classroom Manual, PRC, Jun. 1989 pp. 1-5, 2-3, 2-4, 3-41 to 3-46, 4-3 to 4-10.

*Primary Examiner*—Thomas G. Black
*Assistant Examiner*—Jean R. Homere
*Attorney, Agent, or Firm*—Mark A. Aaker

[57] ABSTRACT

A method for creating and organizing aliases for flies stored on a computer system in which the stored files are searched according to defined search criteria. For files meeting the search criteria, aliases to the files are created, and the aliases are organized together in a display window for presenting the results of the search to the computer user. The computer continues to perform these searching and organizing functions as the computer is used, so that the information presented is current and up-to-date.

10 Claims, 3 Drawing Sheets

METHOD FOR CREATING A COLLECTION OF ALIASES REPRESENTING COMPUTER SYSTEM FILES

This is a continuation of application Ser. No. 08/150,743 filed Nov. 12, 1993, now abandoned, which is a continuation of application Ser. No. 07/756,934 filed Sep. 9, 1991, now abandoned.

BACKGROUND OF THE INVENTION

This invention relates to a method for organizing and displaying information about files stored on a computer. In particular, this invention relates to information presented in a "desktop" representation to the user of a computer.

In current computer systems, stored files are represented to the computer user in a static form, listed by the physical media on which they are stored, or listed in order by a characteristic such as the name or size of the file. In computers supporting the direct manipulation of files in a representation of a desktop, such as the Apple® Macintosh® family of computers, files can be moved by use of a mouse, to place the files in particular locations, or moved within a hierarchy of folders. To use the file, the user must go to where the file is located by opening the appropriate folders to uncover the file.

What is desired is an automatic method of organizing and representing files in categories relevant to the computer user, and continuously updating this representation as the files change.

In software which supports an "alias" function, such as System 7.0 for the Apple Macintosh family of computers, the user can create an alias or "artificial" file which appears on the screen and provides a link or path back to the original file. However, the user still explicitly creates, names, and places aliases on the desktop, although the user can interact with them as if they were the original file.

SUMMARY OF THE INVENTION

In a method in accordance with this invention for creating and organizing aliases for files stored on a computer system, the stored files are searched according to defined search criteria. For files meeting the search criteria, aliases to the files are created, and the aliases are organized together in a special display window for presenting the results of the search to the computer user. The computer continues to perform these searching and organizing functions as the computer is used, so that the information presented is current and up-to-date. The searching and organizing functions can be performed as invisible "background" processes which do not interrupt the users' work. The user can define the search criteria to be used in searching and organizing files.

In a particular embodiment of this invention, the program which performs the searching, aliasing and organizing function is called a "Viewer," since it provides a particular "View" into the set of files stored on the computer system. A Viewer acts as an intelligent folder that continually searches for files meeting a specification supplied by the user. For each file found, an alias is created and this alias appears in the Viewer's folder and window. In effect, a Viewer acts as an automated filing system. A Viewer can be used to organize files, or as a way to find files having a known characteristic, but whose name or location is not remembered. Some common uses of Viewers are to collect aliases to groups of files such as:

All application programs
All mail messages
Files whose text contains the words "progress report"
Files modified today
Files not accessed in the past 12 months
The 10 largest files As the computer system is used and files are added, deleted or modified, the Viewers remove and add aliases to their folders to maintain an accurate representation of the current set of the files stored on the computer system.

DETAILED DESCRIPTION

Figures 1, 2:
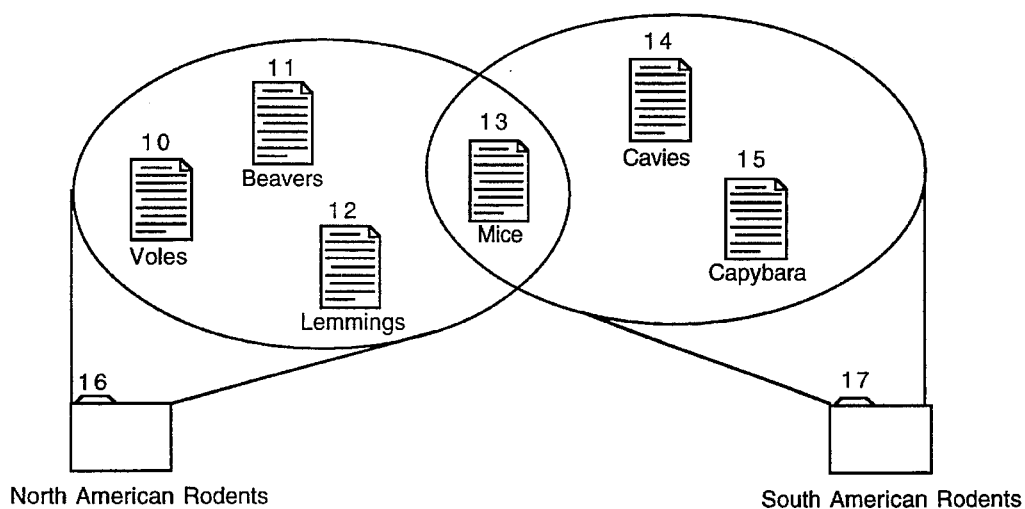
FIG. 1 shows a depiction of searching and organizing files about two different topics in a method in accordance with this invention.
FIG. 2 shows a window for displaying the results of a search and organization in accordance with this invention.

FIG. 1 shows a depiction of searching and organizing files about two different topics in a method in accordance with this invention. Files 10, 11, 12, 13, 14, and 15 each contain information on a separate topic. Files 10 through 13 all meet the requirements of a first categorization, and can be gathered together and stored in a first folder 16. Files 13 through 15 all meet the requirements of a second categorization, and can be gathered together and stored in a second folder 17. Since file 13 meets both categorizations, it would need to be appear in both first folder 16 and second folder 17. To avoid having to place a complete copy of file 13 in both places, the original file 13 can be stored in first folder 16, and an alias to the file 13 can be stored in the second folder 17.

Of course, where the files are originally created and reside elsewhere on the computer system, their representation in either first folder 16 or second folder 17 can be performed by aliases, leaving the original files in their original locations. In this way, files stored on the computer system can be searched to identify files meeting certain criteria. Aliases to these files can be created and gathered to provide an organized view of the files available to the user that meet the search criteria. This process of searching, creating aliases, and organizing for presentation to the user can be repeated for other search criteria and categories. The searching and organizing processes can be repeated in order to keep the results current and up-to-date.

FIG. 2 shows a window for displaying the results of a search and organization in accordance with this invention. For example, suppose a supervisor constructs a department progress report based on the individual progress reports he receives from his employees. In a method in accordance with this invention, the collection of files which can be accessed from the supervisor's computer is searched to identify files having "progress report" in their names. Aliases to these files are created and stored in one folder, even though the original files may reside in many different places or on many different storage devices, including networked devices. By opening this one "Progress Reports" folder, the supervisor has access to all the material needed to prepare their report. FIG. 2 shows the appearance when this "Progress Report" folder is opened. The folder and its contents are represented by a window 22 listing the name and contents of the folder. At the top of the window is the folder name "Progress Reports" 23, and a special icon 24 preceding the name 23. The special icon 24 shows that the contents of this folder are the results of a search, creation of aliases, and organization of aliases—rather than being a normal folder of original files.

Continuing with FIG. 2, the criteria for which files are searched are defined in a "MatchMaker" document 26 listed first in the window. After the "MatchMaker" document 26 are listed the aliases to files found which met the search criteria. The aliases show the "Size", "Kind" and "Last Modified" information about the original files, since that information is more useful to the user, than would be such information directly about the alias itself. The scope and timing of searching are controlled by functions activated by the "where" and "when" control buttons 28 and 29. In operation, the scope of files or storage devices defined by the "where" control 24 are periodically searched as defined according to the "when" control 26. Both local and remote storage devices can be searched at various periodic intervals. As progress reports are found, aliases to them are created and are added to the folder, and their titles will appear in the window 22 when the contents of the folder are displayed. In this way, as progress reports are sent to the supervisor, or as they are deposited on storage devices where they will be found by the searching programs, they are discovered, aliased, and appear in the window. In this way, the results of searching, creating and organizing of aliases are presented to the computer user.

Figure 3:
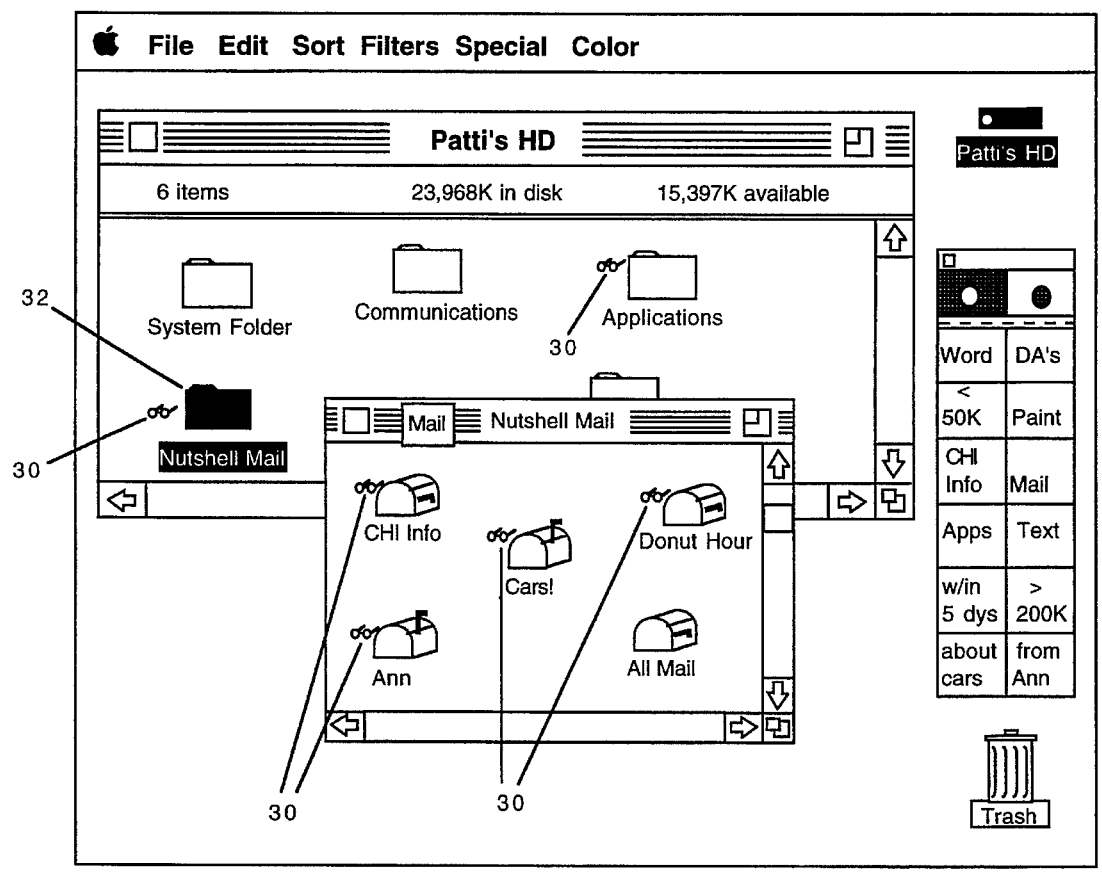
FIG. 3 shows a representation in a desktop environment of displaying the results of a search and organization in accordance with this invention.

FIG. 3 shows a representation in a desktop environment of displaying the results of a search and organization in accordance with this invention. In this desktop environment, taken from an Apple Macintosh computer, a special icon 30 precedes folders or objects which store the collections of aliases resulting from a search and organization of aliases in accordance with this invention. For example, the folder "Nutshell Mail" 32 contains collected aliases, and so its folder icon is preceded by the special "viewer" icon 30 resembling, in this embodiment, a small pair of eyeglasses. Within the Nutshell Mail folder 32, are several "mailboxes," which are a collection of aliases according to certain topic criteria, and therefore their icons are preceded by the special icon 30. These examples in FIGS. 2 and 3 represent a preferred way of presenting organized collections of aliases to a computer user. Of course, other presentations are possible, and can vary widely depending on the characteristics of the environment in which the user interacts with the computer system. Other icons, special labeling such as bold or italic fonts, or additional labels can be used to identify collections of aliases.

Figure 4:
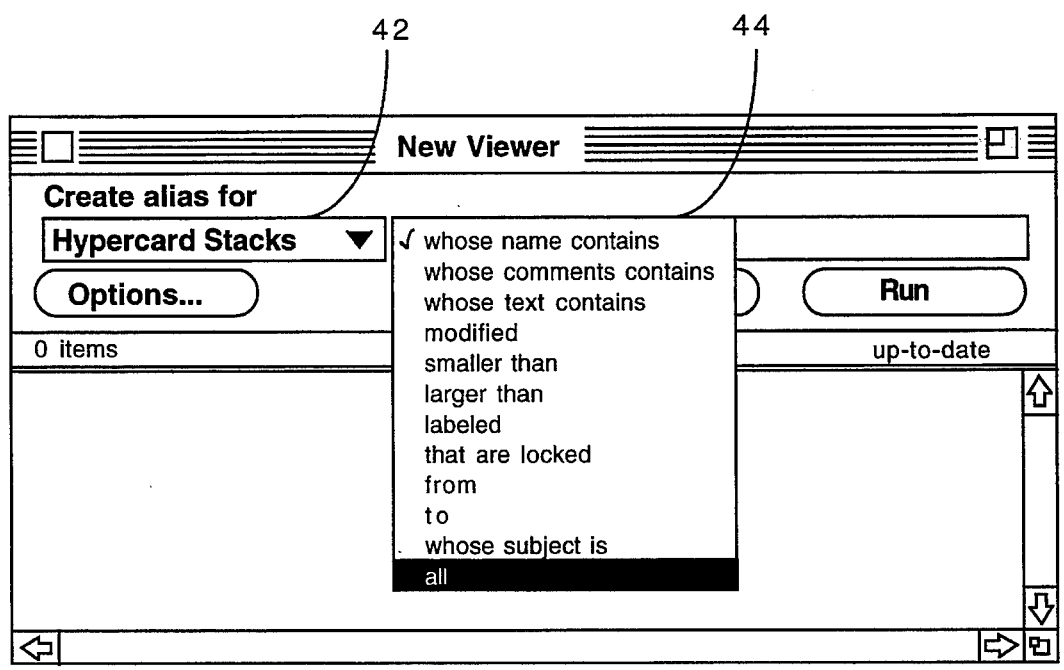
FIG. 4 shows a window which allows the user to define search criteria for a new viewer.

In operation, to create a new Viewer the user selects "New Viewer" from the File Menu on the computer's menu bar. The result is a new viewer folder and window. The Viewer will begin life with no aliases since it has no search criteria. Search criteria are specified by the user. FIG. 4 shows a window which allows the user to define search criteria for a new viewer. In a first column 42, the user selects the type of files to be matched. In FIG. 4, the first column 42 is shown set to "Hypercard stacks" rather than to some other of the many file types known to the computer operating system. In a second column 44, the user can select further specific criteria to be used in selecting among the files selected in the first column 42. In FIG. 4, the second column 44 is shown open to display the many available options, The options shown in column 2 are but a small set of the types of characteristics of files that are generally known or discoverable about the selected objects. Additional columns can be used to further define the search criteria. Clearly, other criteria definition and selection tools can be provided as appropriate and consistent to the user's particular interaction environment. Other buttons and controls in the window provide access to optional features, or control the running of the program. Both default, and constrained sets of options can be provided, and user should be able to define their own sets of options. In a preferred embodiment, an abbreviation of the criteria selected is used to automatically generate a name for the new viewer and the resulting viewer folder.

In an alternative embodiment, search criteria are stored in a new type of document called a "MatchMaker" document. Sometimes you may want to have more than one search specification per viewer and you may do so by having multiple "MatchMaker" documents with the matches from each showing up as aliases in the window, i.e. the criterion are combined by a logical "OR". Like other documents, "MatchMaker" documents can be moved and copied so that "MatchMaker" documents can be stored and reused. Access to alternative "MatchMaker" documents could be done by providing a Viewer with that criterion.

In other embodiments, rather than defining search criteria via a form, it can be specified by menus, scripting, rules, a formal specification language, or visual programming. You would of course be able to combine specifications in logical ways, modify existing specifications and distribute specifications to other users. You would also be able to modify the viewer icon so that each viewer type you create could look distinct.

In other embodiments, the file search can return a ranking of each file based on some metric for how well the contents or other characteristics of the file fit the search criteria. This value may be as simple as the number of occurrences of a search term within the file. For these Viewers, a display of the aliases in order of "relevance" can be performed.

In other possible embodiments, if we allow inheritance of characteristics, a viewer can be placed inside of a viewer, knowing that the search domain of the "inner" viewer is already restricted to files found by the "outer" viewer. This is one of several versions of the logical "AND" function that can be provided.

An important operating consideration is how to define where to search. One embodiment would provide the user a scrolling list of local disks and folders as well as networked servers and volumes with the user being able to copy from the list to the "search space" list. Another possibility is to have a folder where users store aliases of places to look. This could be accomplished easily by allowing users to drag folders, disks and servers into this "where to look" folder. In either case, defaults such as "parent folder," "local physical media" and "mounted volumes" can be used.

An important control function is to determine when to search and how often to repeat searches. Since the computer has a limited number of operation cycles to keep all the viewers up to date, there will be periods during which some viewers are "stale" or out-of-date. One aspect seems clear; users should be able to determine when each source was last checked for matches, perhaps through a menu choice "Get Information". Also crucial is the ability to say "search now."

Another view of the method of this invention is that it provides a secondary and parallel organization of files stored on a computer system. The primary organization of files being done by the computer's operating system to track files by name or storage location. The method to create and represent this secondary organization occurs by:

searching the stored files for specific characteristics;

for each file having the characteristics, to create a secondary identifier for the file which leads to the file's primary name and location;

organizing the secondary identifiers in groups having common characteristics; and representing the organization of said secondary identifiers to a user of the computer system through a special symbol.

The following notes have been determined from an implementation of Viewers for the Apple Macintosh family of computers. The Viewers were built as a System 7 Finder extension. The code is divided into five source files which parallel the structure of the implementation.

ViewerExtension.c

Includes functions such as ExtensionIdle and ExtensionFolderCreate that are common to all extensions.

ViewerCentral.c

ViewerCentral keeps a list of all viewers found on the computer system. Additions and deletions to this list are made from various places via the global ViewerCentral. ViewerCentral handles modifications to the Finder menu bar and handles commands from these additional menu items, for example, "New Viewer."

Viewer.c

Viewer.c is the largest piece of code and defines the Viewer object itself. While there is only one ViewerCentral object there are as many Viewer objects as there are Viewers. Viewer.c has the code for all of the Viewer's interface elements and for the updating of the Viewer.

ViewerSearcher.c

One searcher is shared by all of the Viewers. The Viewer holds all of the search state information which it passes to the searcher on each search.

ViewerSpec.c

Every Viewer needs at least one specification to base its search on but can have any number of specifications. ViewerSpec.c defines the ViewerSpec object.

In the current update strategy, Viewers get updating time through the idle mechanism. This can come directly to the Viewer object if it has an open window or indirectly through the extension's idle. Thus, Viewers that are open will be updating frequently (if they are not already "up-to-date") and those that are closed will be updating infrequently because they are sharing the extension's idle time with all the other Viewers. Upon opening a viewer, it immediately updates itself unless it it already up-to-date. In the current implementation, no Viewer has any more priority than any other. But, for example, Viewers looking for mail might be given more idle time even when closed because incoming mail is an important event.

In current implementations, Viewers rely completely on a search strategy, that is, there is no notification mechanism to alert Viewers of changes. The strategy, in simplified psuedocode, works as follows.

```
IDLE ( )
If there are files in the queue (found on last search)
    While we have time (work in small bites)
        If we don't already have the file in the viewer
            Make an alias to the file
Else (No files in queue look for more matches)
    Get the next specification
    Get the next disk to search
    See if it is time to re-search this disk
    If just starting update
        Make a list of all children
    If first pass with this disk and specification
        Mark those found on this disk with this specification
    Search for N tenths of a second
    If search at end of disk
        pop disk from disk list
    If update of viewer is complete
        Delete files that no longer meet specification
        Move viewer to end of list of all viewers
Return
```

This strategy works but is computationally intensive and not very fast to reveal changes. On the other hand, it may be satisfactory from a practical implementation standpoint. A possible alternative update strategy of having viewers constantly poll for files is also computationally intensive and makes viewers slow to react to changes. The Viewers performance could be substantially improved if it could be notified, for example by the Macintosh Finder, of those files that have been modified, deleted or added. In the case of file additions or modifications the Viewer could simply pass this list of files along with the search criteria to the search program for testing. There would still remain those cases where a file should be added to or removed from a Viewer simply because the time is now different. For example a Viewer for, "All files modified yesterday" would need to be notified of file system changes but would also need to research completely at the start of a new day.

At present the Viewer maintains separate update times for each disk storage device, that is, a single value for storing the time when it last searched. This strategy is fine if no disks are added to the disk list after the Viewer first searches. This strategy may fail when a disk is mounted if the Viewers last update time is more recent than the modification date of the disk. A solution may be to set the modification date of any disk that is mounted.

A Viewer created within a Viewer would work only on the files in the parent Viewer. If the parent Viewer collected, for example, mail, then new Viewers could be created within the Mail Viewer to further sort the mail by subject, addressee, time received, and so forth.

A possible enhancement is for the viewer to change color or icon appearance upon finding of a new file meeting the search criteria, thus notifying the user of an addition to the viewer. This feature would be especially useful with mail or Viewers that look onto file servers.

Viewers that collect files based on the text in the file have been implemented. In one version the search program returns with a value suggesting how good a match each files was. Files can then be sorted in order of this relevance value.

Currently, Viewers just keep operating except for the user stopping the Viewer to change the search criterion. Other means to halt the search can be provided. Control of the updating frequency for a Viewer in the form of prioritizing can be provided.

Other embodiments and variations of the invention will be apparent to one skilled in the art from a consideration of the specification, drawings, and claims. It is intended that the scope of the invention be limited only by the scope of the following claims.

I claim:

1. A method for creating and representing by icons a secondary and parallel organization of files stored on a computer system, in which a primary organization provides a name and storage location for each file stored, said method comprising the steps of:

defining by a computer user a set of specific file characteristics;

after said defining, searching by the computer system for fries having said specific file characteristics;

for each file having said specific file characteristics, creating a secondary identifier for the file which leads to the file's primary name and location, and representing the secondary identifier by an icon;

collecting said created secondary identifiers in a group of secondary identifiers to files having said specific file characteristics in common;

representing said group of said secondary identifiers to said user of said computer system by displaying a visual icon for each said group having common characteristics;

repeating said steps of searching, creating, collecting, and representing for the same said specific file characteristics during the operation of the computer by said user; and removing from said group of secondary identifiers, secondary identifiers for fries which no longer meet said specific file characteristics.

2. A method as in claim 1 wherein said searching includes attached computer systems.

3. A method as in claim 1 further comprising repeating said steps for another set of specific file characteristics.

4. A method as in claim 1 further comprising continuously updating said group of secondary identifiers and said visual icon as modification of a file occurs to any of said files having said specific file characteristics.

5. A method as in claim 4 further comprising receiving notification of said modification of a file from software operating on said computer system.

6. A method for creating and representing by icons a secondary and parallel organization of files stored on a computer system, in which a primary organization provides a name and storage location for each file stored, said method comprising the steps of:

defining by a computer user a set of specific file characteristics;

after said defining, searching by the computer system for files having said specific file characteristics;

for each file having said specific file characteristics, creating a secondary identifier for the file which leads to the file's primary name and location, and representing the secondary identifier by an icon;

collecting said created secondary identifiers in a group of secondary identifiers to files having said specific file characteristics in common;

representing said group of said secondary identifiers to said user of said computer system by displaying a visual icon for each said group having common characteristics;

repeating said steps of searching, creating and collecting for the same said specific file characteristics and replacing the previous group of secondary identifiers with the current group of secondary identifiers; and changing a visual appearance of the visual icon representing the group of secondary identifiers during the step of replacing the previous group of secondary identifiers with the current group of secondary identifiers.

7. A method as in claim 6 wherein said searching includes attached computer systems.

8. A method as in claim 6 further comprising repeating said steps for another set of specific file characteristics.

9. A method as in claim 6 further comprising continuously updating said group of secondary identifiers and said visual icon as modification of a file occurs to any of said files having said specific file characteristics.

10. A method as in claim 9 further comprising receiving notification of said modification of a file from software operating on said computer system.

* * * * *

UNITED STATES PATENT AND TRADEMARK OFFICE
CERTIFICATE OF CORRECTION

PATENT NO. : 5,504,852
DATED : April 2, 1996
INVENTOR(S) : John Thompson-Rohrlich It is certified that error appears in the above-identified patent and that said Letters Patent is hereby corrected as shown below:

Title page,
Item [57], ABSTRACT,
Line 1, change "flies" to -- files --.

Column 1,
Line 53, change "users'" to -- user's --.

Column 2,
Lines 36-37, change "it would need to be appear" to -- it would need to appear --.
Line 67, change "their" to -- his --.

Column 3,
Line 15, delete ",".
Line 20, change "24" to -- 28 --.
Line 21, change "26" to -- 29 --.
Line 61, change "Hypercard stacks" to -- Hypercard Stacks --.
Line 66, change comma "," to period -- . --.
Line 67, change "2" to -- 44 --.

Column 6,
Line 33, delete ",".
Line 40, change "Viewers" to -- Viewer's --.
Line 50, delete "of".
Line 56, change "files" to -- file --.

Column 7,
Lines 10 and 27, change "fries" to -- files --.

Signed and Sealed this

Twenty-eighth Day of February, 2006

JON W. DUDAS
*Director of the United States Patent and Trademark Office*